United States Patent
Crawford et al.

[11] Patent Number: 6,007,754
[45] Date of Patent: Dec. 28, 1999

[54] METHOD FOR MAKING A SET OF EMBOSSING DIES

[75] Inventors: Alan D. Crawford, Burbank; Kevin L. Corcoran, Mission Viejo; Adrienne T. DiCamillo, Redondo Beach, all of Calif.

[73] Assignee: Ellison Educational Equipment, Inc., Lake Forest, Calif.

[21] Appl. No.: 09/081,112

[22] Filed: May 19, 1998

[51] Int. Cl.⁶ .......................... B29C 43/04; B29C 59/02; B29C 33/38; B29C 33/40
[52] U.S. Cl. .......................... 264/219; 264/139; 264/154; 264/293; 264/320; 425/385; 425/394; 425/400; 425/411; 156/256; 156/264; 156/265; 156/299
[58] Field of Search .................................... 264/139, 153, 264/154, 155, 219, 293, 320, 322; 156/256, 264, 265, 267, 299; 425/385, 394, 400, 408, 411

[56] References Cited

U.S. PATENT DOCUMENTS

| | | | |
|---|---|---|---|
| 2,595,970 | 5/1952 | McGill | 264/153 |
| 2,876,575 | 3/1959 | Leika | 156/248 |
| 3,534,440 | 10/1970 | Roberts | 425/195 |
| 4,692,198 | 9/1987 | Borresen | 156/235 |
| 5,112,423 | 5/1992 | Liebe, Jr. | 156/234 |
| 5,368,672 | 11/1994 | Gunzelman et al. | 156/248 |
| 5,383,996 | 1/1995 | Dressler | 156/234 |

*Primary Examiner*—Jan H. Silbaugh
*Assistant Examiner*—Michael Poe
*Attorney, Agent, or Firm*—Morland C. Fischer

[57] ABSTRACT

A method by which to easily and inexpensively make a matched set of male and female embossing dies so that articles can be embossed in an arts and crafts environment. Upper and lower sheets of adhesive are applied to opposite faces of a substrate, and each adhesive layer is covered with a paper backing to form a sandwich with the substrate secured between the upper and lower sheets. A design to be embossed is then cut through the sandwich. A portion of the backing covering the upper adhesive sheet is removed to expose an area of the adhesive, and a first die plate is bonded to the upper sheet. A different portion of the backing covering the lower adhesive sheet is removed to expose an area of the adhesive, and a second die plate is bonded to the lower sheet. The first and second die plates are pulled away from one another with a first part of the design cut through the sandwich affixed to the first die plate to form a male die half and the remaining part of the design cut through the sandwich affixed to the second die plate to form a female die half.

10 Claims, 7 Drawing Sheets

METHOD FOR MAKING A SET OF EMBOSSING DIES

BACKGROUND OF THE INVENTION

1. Field of the Invention

This invention relates to a method by which a matched set of male and female embossing dies can be quickly, easily and inexpensively manufactured at home, at school, and at the office so that a material can be embossed with a design without requiring any special manufacturing or operating equipment or skills.

2. Background Art

Embossing is an art form that has long been used by those engaged in industrial and commercial enterprises. However, the methods heretofor employed for making an embossing die have often been complicated and require special skills. More particularly, special molds and/or expensive cutting machines are typically used to manufacture a matched set of embossing dies. In this same regard, the dies cannot be made or the machinery operated by anyone other than an experienced die maker. Because of the complex equipment, costs, and level of skill associated with making most embossing dies, there is little opportunity to manufacture a set of embossing dies at home, at school or at the office.

Therefore, what is needed is a method for easily making a matched pair of embossing dies without requiring complicated and expensive equipment or die making experience to enable articles to be embossed at home in an arts and crafts environment rather than a large scale industrial or commercial environment as has otherwise been common in the past.

SUMMARY OF THE INVENTION

In general terms, a method is disclosed by which to easily and inexpensively make a matched set of male and female embossing dies so that articles can be embossed in an arts and crafts environment. Upper and lower adhesive film sheets are positioned one above the other with an incompressible substrate located therebetween to form a sandwich. Each of the upper and lower adhesive film sheets has an outer and an inner face that is covered by a removable paper backing. The backing which covers the inner face of each sheet is removed, and the upper and lower adhesive film sheets are bonded to opposite sides of the substrate. A suitable cutting tool or die is then used to cut completely through the sandwich to outline the design to be embossed into a material.

A portion of the backing which covers the outer face of the upper adhesive film sheet through which the design is cut is removed to expose some of the adhesive of the upper sheet. A male die plate is affixed to the top of the sandwich at the outer face of the upper sheet by means of the exposed area of adhesive. A portion of the backing which covers the outer face of the lower adhesive film sheet through which the design is cut is removed to expose some of the adhesive of the lower sheet. A female die plate is affixed to the bottom of the sandwich at the outer face of the lower sheet by means of the exposed area of adhesive. Next, the first and second die plates are pulled away from one another to carry adhesively bonded complementary pieces of the design cut through the sandwich, whereby to form a matched set of male and female die halves.

A material to be embossed is placed between the set of male and female die halves. Pressure is applied to force the die halves together to emboss the material with the design. Registration pins extend from the male die plate to be received in corresponding holes in the female die plate so that the set of die halves can be precisely aligned one above the other. In the alternative, the male and female die halves are laid above one another and seated upon a carrier plate with registration pins projecting upwardly from the carrier plate being received through axially aligned holes in the male and female die plates.

DETAILED DESCRIPTION

Figure 1:
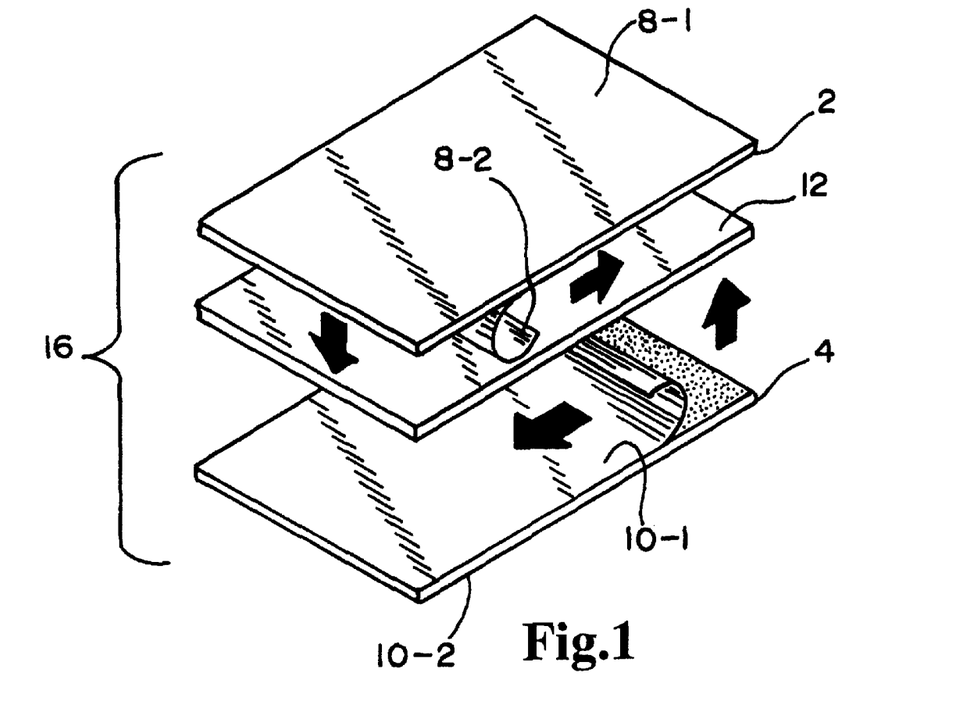
FIG. 1 is an exploded view of upper and lower adhesive film sheets and a substrate located therebetween which are bonded together to form a sandwich from which a matched set of male and female embossing dies are cut according to the method of the present invention.

The method of this invention for making a matched set (designated 1 in FIG. 8) of male and female embossing dies 24 and 30 is described in detail while referring to the drawings, where FIG. 1 shows thin, upper and lower sheets 2 and 4 of adhesive film such as that manufactured by the 3M Company. The top and bottom of the upper adhesive film sheet 2 are covered by respective peel-off paper backings 8-1 and 8-2, and the top and bottom of the lower adhesive film sheet 4 are covered by respective peel-off paper backings 10-1 and 10-2. The paper backings 8-2 and 10-1 which cover the bottom of the upper sheet 2 and the top of the lower sheet 4 are removed (i.e. peeled off) and discarded. With the adhesive films of the upper and lower sheets 2 and 4 now exposed, a substrate 12 is positioned between the adhesive bearing faces of the upper and lower sheets 2 and 4. Pressure is applied to force the upper and lower sheets towards one another until the substrate 12 is adhesively bonded between the bottom of the upper adhesive film sheet 2 and the top of the lower adhesive film sheet 4 to form a sandwich 16 as is best illustrated in FIG. 2.

The substrate 12 is preferably manufactured from a relatively thick, incompressible material that can be easily cut by a knife, razor edge or similar tool. By way of example only, the substrate 12 is made from PVC, although other suitable materials such as high density paper, thin aluminum, or balsa wood can also be used. The substrate 12 provides the sandwich 16 with sufficient strength and thickness to enable a design to be cleanly cut therein.

Figure 2:
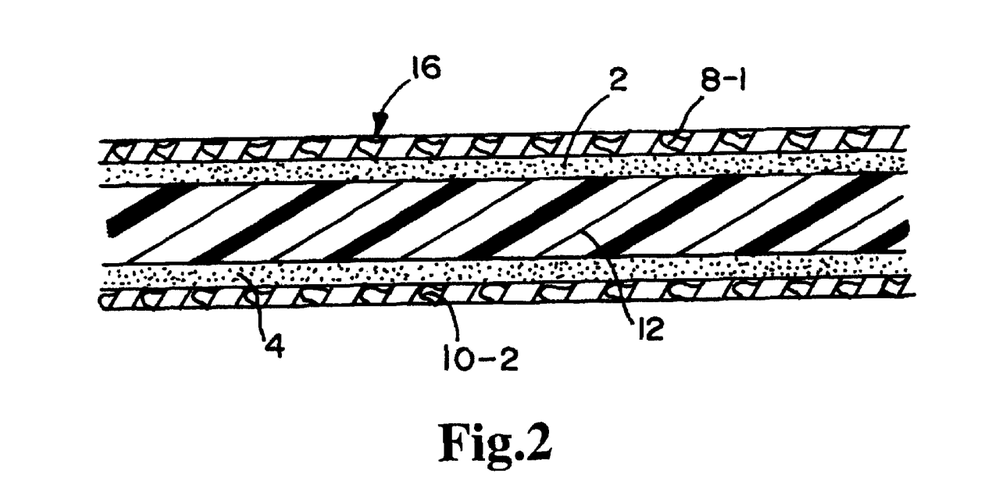
FIG. 2 shows a cross section of the sandwich formed when the upper and lower adhesive film sheets of FIG. 1 are bonded to the substrate therebetween.
Figures 3, 4:
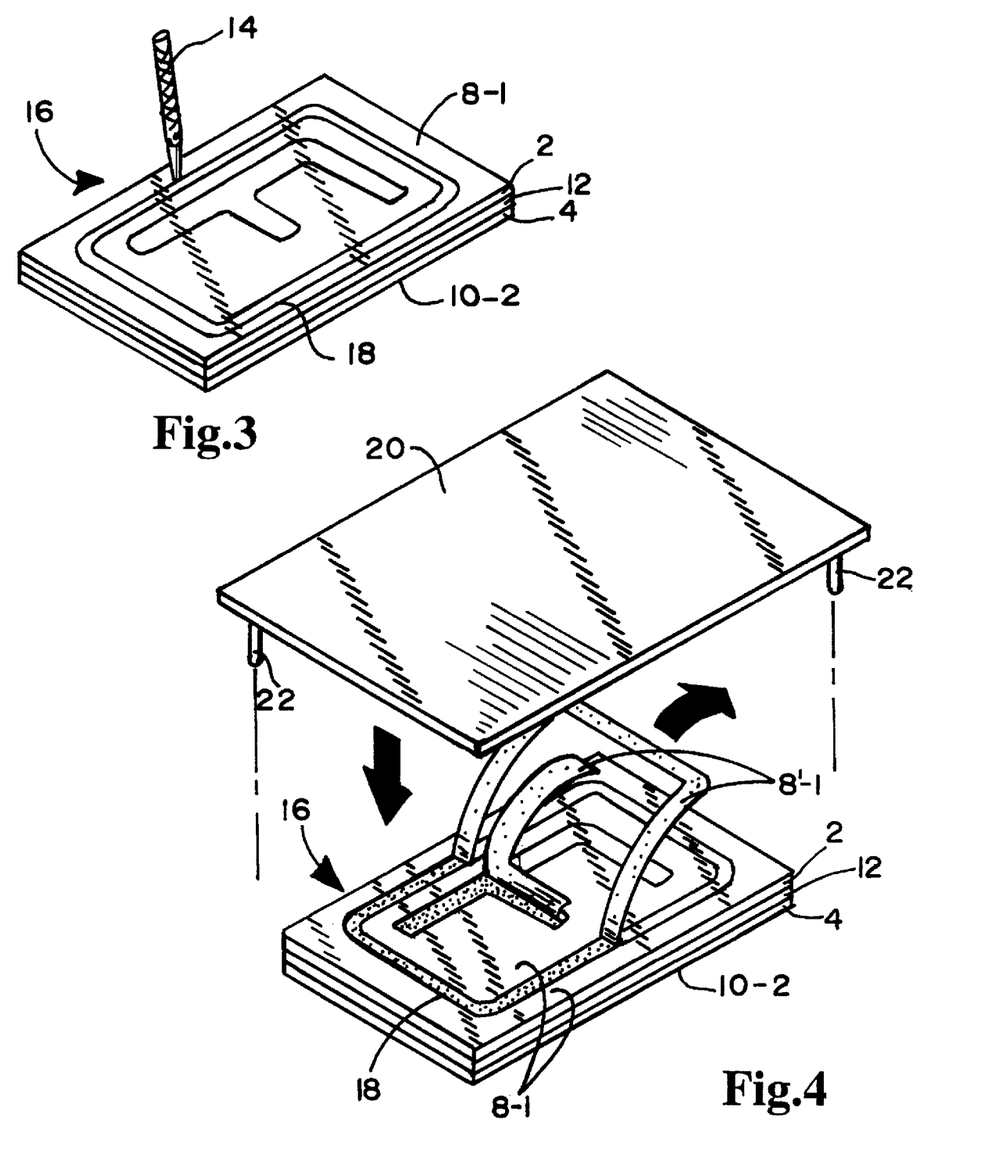
FIG. 3 shows a design being cut through the sandwich of FIG. 1.
FIG. 4 shows a male die plate being adhesively bonded to the top of the sandwich after the design is cut therethrough.
Figure 12:
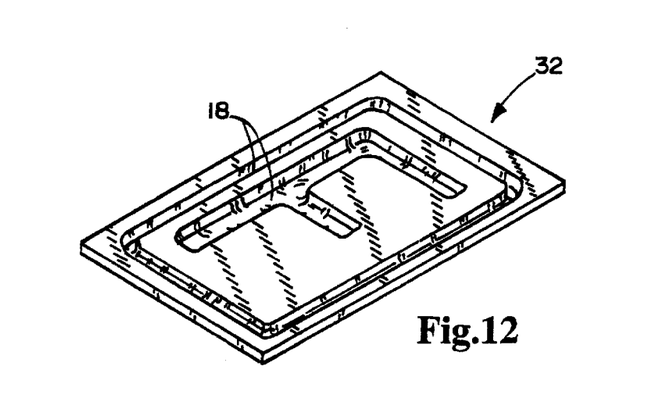
FIG. 12 shows the material after it has embossed with the design.

FIG. 3 of the drawings shows the use of a cutting tool 14 to cut completely through the sandwich 16 of FIG. 2 so as to outline the design 18 that will ultimately be embossed into a material 32 as shown at FIG. 12. In the alternative, a commercially available cutting die may also be used to cut the design 18 through sandwich 16. In the illustration of FIG. 3, the design 18 being cut through sandwich 16 is the letter "F." However, it to be understood that other letters, numbers, images, and the like (such as that shown at FIG. 13), may also be made. In this regard, when the cutting tool 14 cuts design 18 through the sandwich 16 containing upper and lower adhesive film sheets 2 and 4 and the substrate 12 adhesively bonded therebetween, the paper backing 8-1 is still attached over the top of the sandwich 16 at upper sheet 2, while the paper backing 10-2 remains attached over the bottom of the sandwich 16 at lower sheet 4 to avoid contact with the adhesive film of sheets 2 and 4.

FIG. 4 of the drawings shows a cut out portion 8'-1 of the paper backing 8-1 from the design 18 cut through sandwich 16 being peeled off the top of the upper adhesive film sheet 2. When the cut out portion 8'-1 of paper backing 8-1 is removed, some of the adhesive film of upper sheet 2 which is initially covered by backing portion 8'-1 will now be exposed to provide a sticky surface along the top of sandwich 16.

At this point, a male die plate 20 is affixed to the top of the sandwich 16. The male die plate 20 has one or more (e.g. two) registration pins 22 projecting therefrom that are sized to be received by corresponding holes (designated 28 in FIG. 8) when the male die plate 20 is mated to a female die plate 26 as will soon be disclosed. The male die plate 20 is now pressed against the top of the sandwich 16. By virtue of the area of adhesive from the upper sheet 2 which has just been exposed by removing the backing portion 8'-1, a first part of the design 18 that has been cut through the sandwich 16 and that lies below the exposed area of adhesive film sheet 2 will be bonded to the bottom of male die plate 20. Accordingly, a first or male die half 24 (best shown in FIG. 6) has now been defined. It may be appreciated that the outer-most facing surface of the male die half 24 shown in FIG. 6 and defined by the first cut out part of the design 18 remains covered by the original paper backing 10-2 that extends over the bottom of the lower sheet 4 of the sandwich 16 of FIG. 3.

Figures 5, 6:
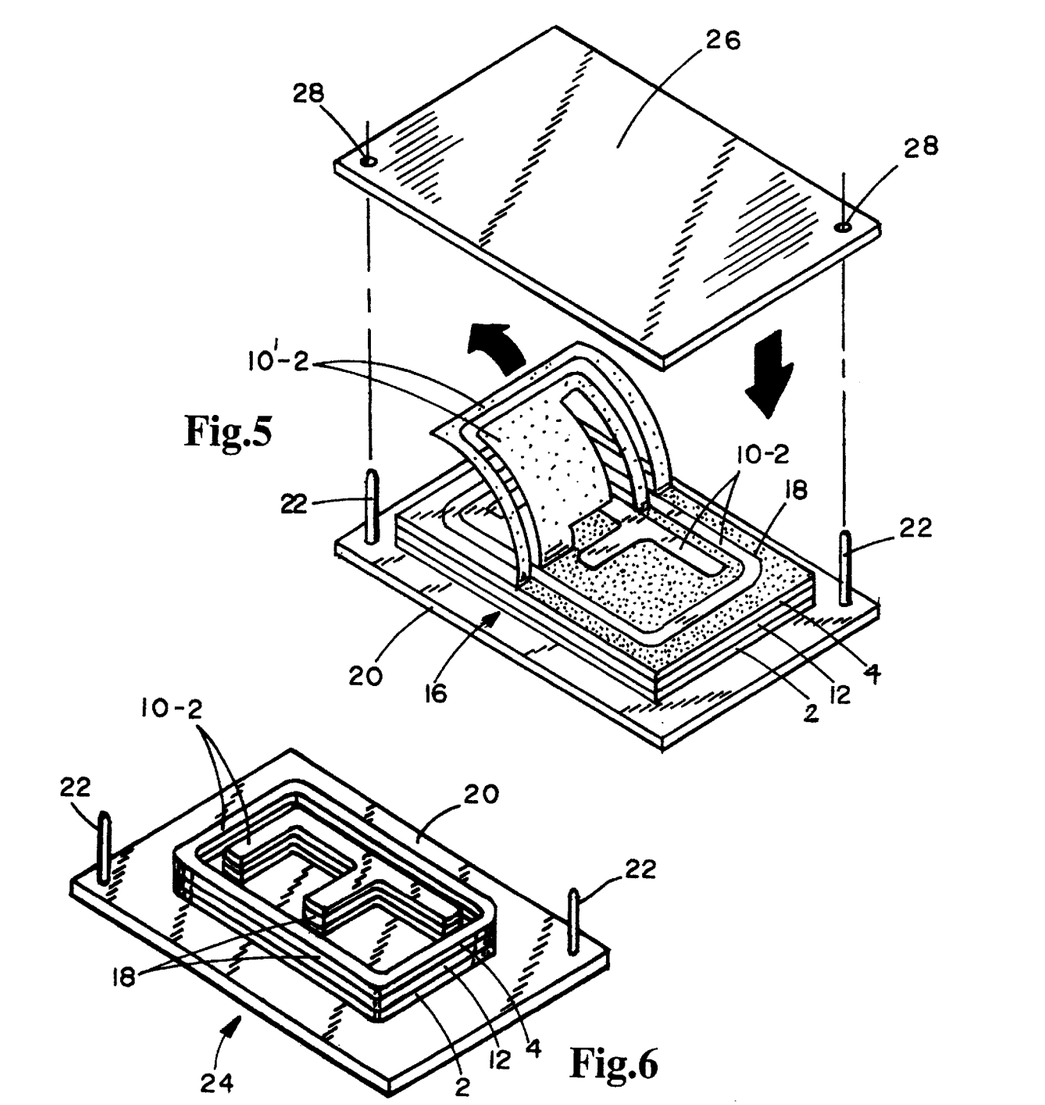
FIG. 5 shows a female die plate being adhesively bonded to the bottom of the sandwich after the male die plate has been bonded to the top of the sandwich.
FIG. 6 shows the male half of a matched set of dies bearing one portion of the design cut through the sandwich.

FIG. 5 of the drawing shows the sandwich 16 of FIG. 4 turned upside down and a portion 10'-2 of the paper backing 10-2 being peeled off the lower adhesive film sheet 4 after the male die plate 20 is adhesively bonded to the top of the sandwich 16. Once the backing portion 10'-2 is removed, some of the lower sheet 4 which is initially covered by backing portion 10'-2 is now exposed to provide a sticky surface along the bottom of sandwich 16. The sticky surface enables a female die plate 26 to be affixed to the sandwich 16 along the bottom of lower sheet 4. The female die plate 26 has a corresponding number of holes 28 which are sized and positioned to receive the registration pins 22 projecting from the male die plate 20 (best shown in FIG. 8) to ensure that the male and female die plates 20 and 26 will be accurately aligned relative to one another to form the matched die set 1 shown in FIG. 8.

The female die plate 26 is now pressed against the lower adhesive film sheet 4 of sandwich 16. By virtue of the adhesive area of the lower sheet 4 which has just been exposed by removing backing 10'-2, the remainder of the design 18 that has been cut through the sandwich 16 and that lies below the just exposed adhesive area of film sheet 4 will be bonded to the bottom of the female die plate 26. Accordingly, a second or female die half 30 (best shown in FIG. 7) will now be defined. It may once again be appreciated that the outer-most facing surface of the female die half 30 shown in FIG. 7 and defined by the remaining cut out part of the design 18 continues to be covered by the original paper backing 8-1 that extends over the top of the upper sheet 2 of the sandwich 16 of FIG. 3.

Figure 7:
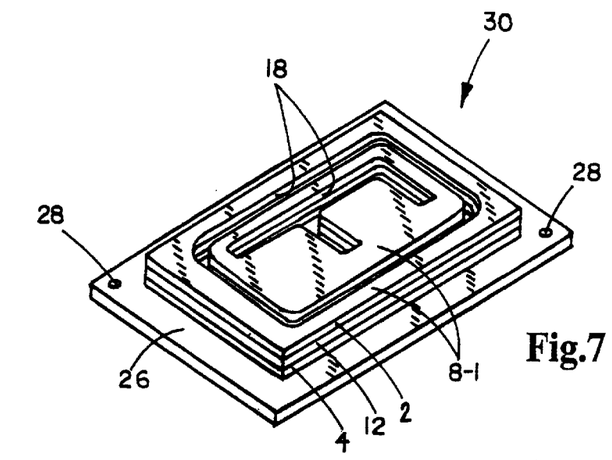
FIG. 7 shows the female half of the matched set of dies bearing a complementary portion of the design cut through the sandwich.

Next, the male and female die plates 20 and 26 are pulled away from one another with the first part of the design 18 cut through sandwich 16 adhesively bonded to and carried by the male die plate 20 to form the male die half 24 of FIG. 6 and the remaining part of the design 18 cut through sandwich 16 adhesively bonded to and carried by the female die plate 26 to form the female die half 30 of FIG. 7. It should be recognized that the first and remaining parts of the design 18 that are bonded to the male and female die plates 20 and 26 to form the pair of die halves 24 and 30 are the complements of one another. That is to say, the combination or addition of the first and remaining design parts will form the complete design 18 that has been cut through the sandwich 16 as was previously disclosed when referring to FIG. 3.

Figure 8:
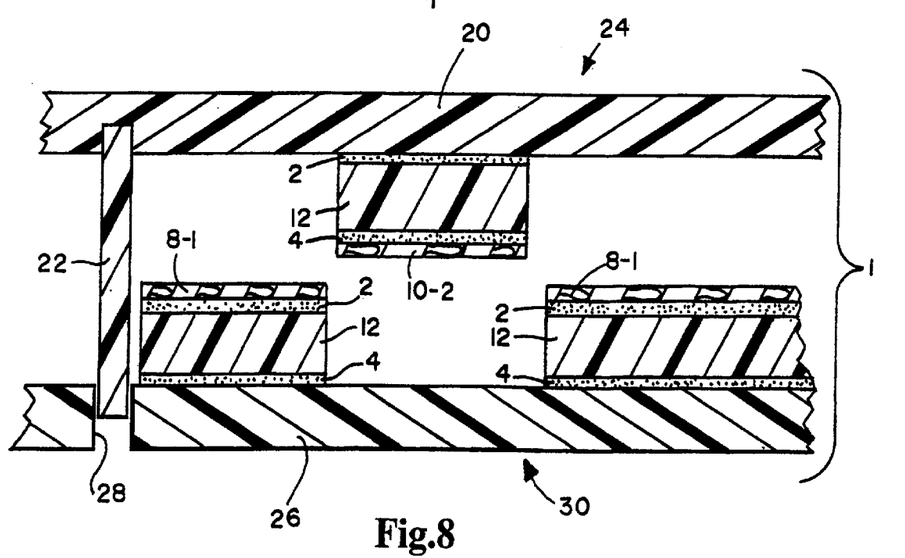
FIG. 8 shows the matched set of male and female die halves of FIGS. 6 and 7 being moved into registered alignment with one another.

A matched set of male and female die halves 24 and 30 shown in FIGS. 6 and 7 are now formed having opposing die plates 20 and 26 that are to be moved towards one another so as to be positioned one above the other as shown in FIG. 8. As previously described, the registration pins 22 from the male die plate 20 are received through holes 28 in the female die plate 26 to maintain an accurate alignment of the male and female die plates. Thus, the male and female die halves 24 and 30 have complementary shapes which, when properly aligned, create the original design 18 that is cut into the substrate 16 of FIG. 3.

Figure 9:
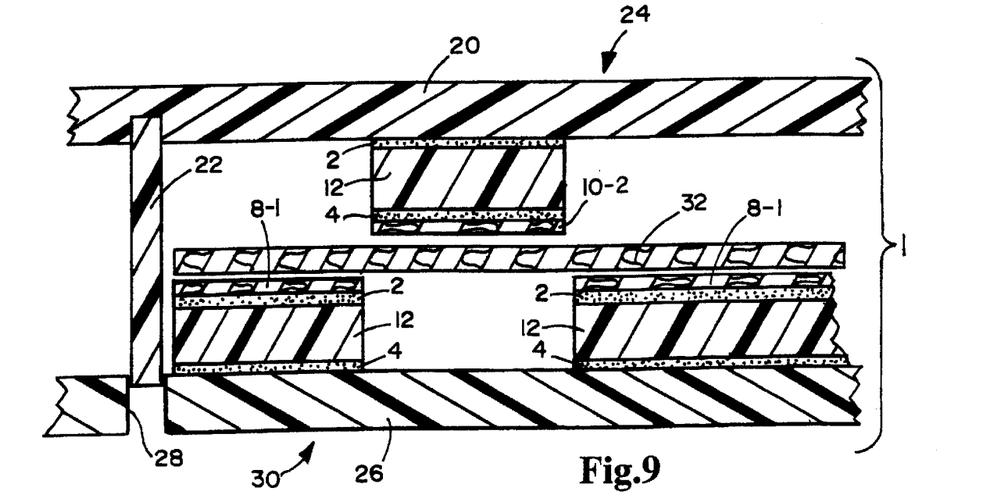
FIGS. 9–11 illustrates the steps for using the matched set of die halves for embossing a material with the design cut through the sandwich of FIG. 3.
Figure 10:
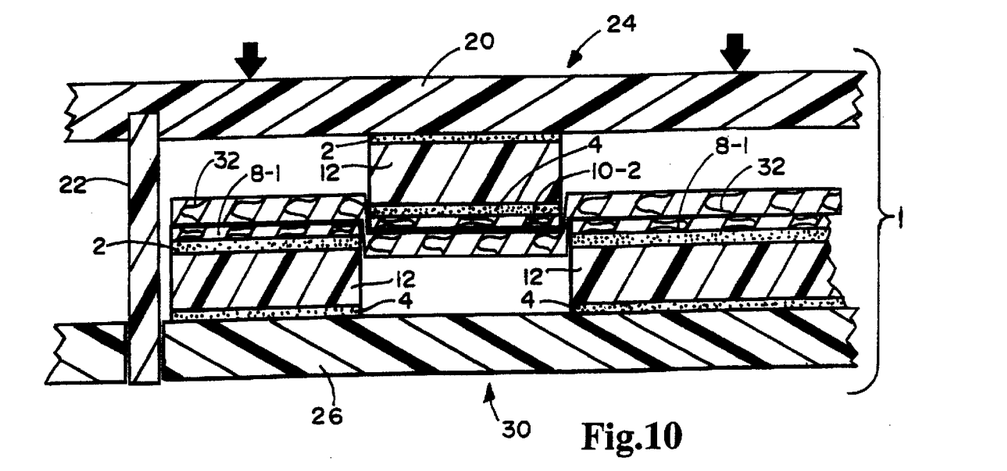

In use, and as is shown in FIG. 9 of the drawings, a material 32 to be embossed is laid between the opposing die plates 20 and 26 of the matched set of die halves 24 and 30. The material 32 to be embossed can be a thick paper sheet, thin plastic, card stock, etc. In FIG. 10, a compressive force is applied (e.g. by means of a conventional hand operated press, or the like) to the male and female die plates 20 and 26 to force the male and female die halves 24 and 30 towards one another and the registration pins 22 to be moved in the corresponding holes 28, whereby the position of the male and female die plates 20 and 26 above one another will be preserved. Accordingly, the compressive force is transferred to the opposing die faces that are adhesively bonded to the male and female die plates 20 and 26 to emboss the material 32 with the original design 18 into which the sandwich 16 of FIG. 3 was cut.

Figure 11:
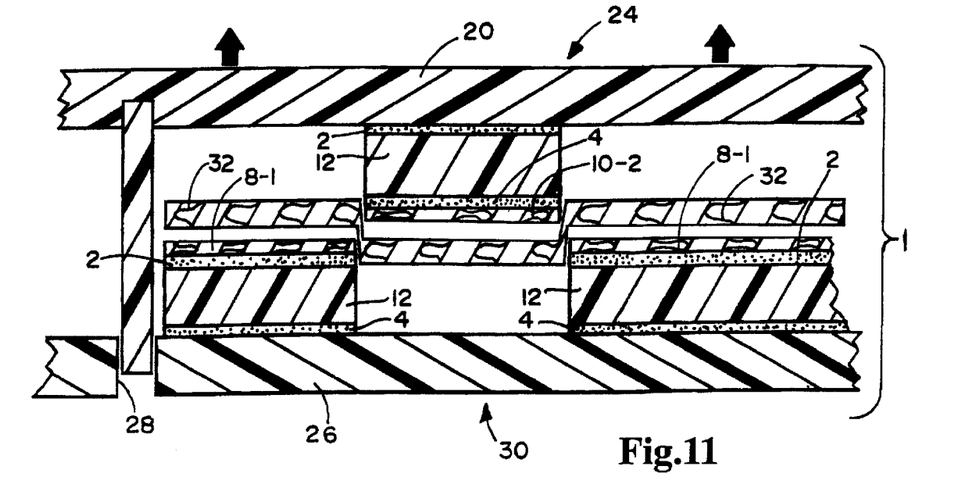

In FIG. 11, the matched set of male and female die halves 24 and 30 are separated from one another to relieve the embossing pressure that has been applied to material 32. The material 32 is now free to be removed from between the opposing die plates 20 and 26 of die halves 24 and 30 with the design 18 neatly and clearly embossed therewithin in the manner shown by FIG. 12.

Figure 13:
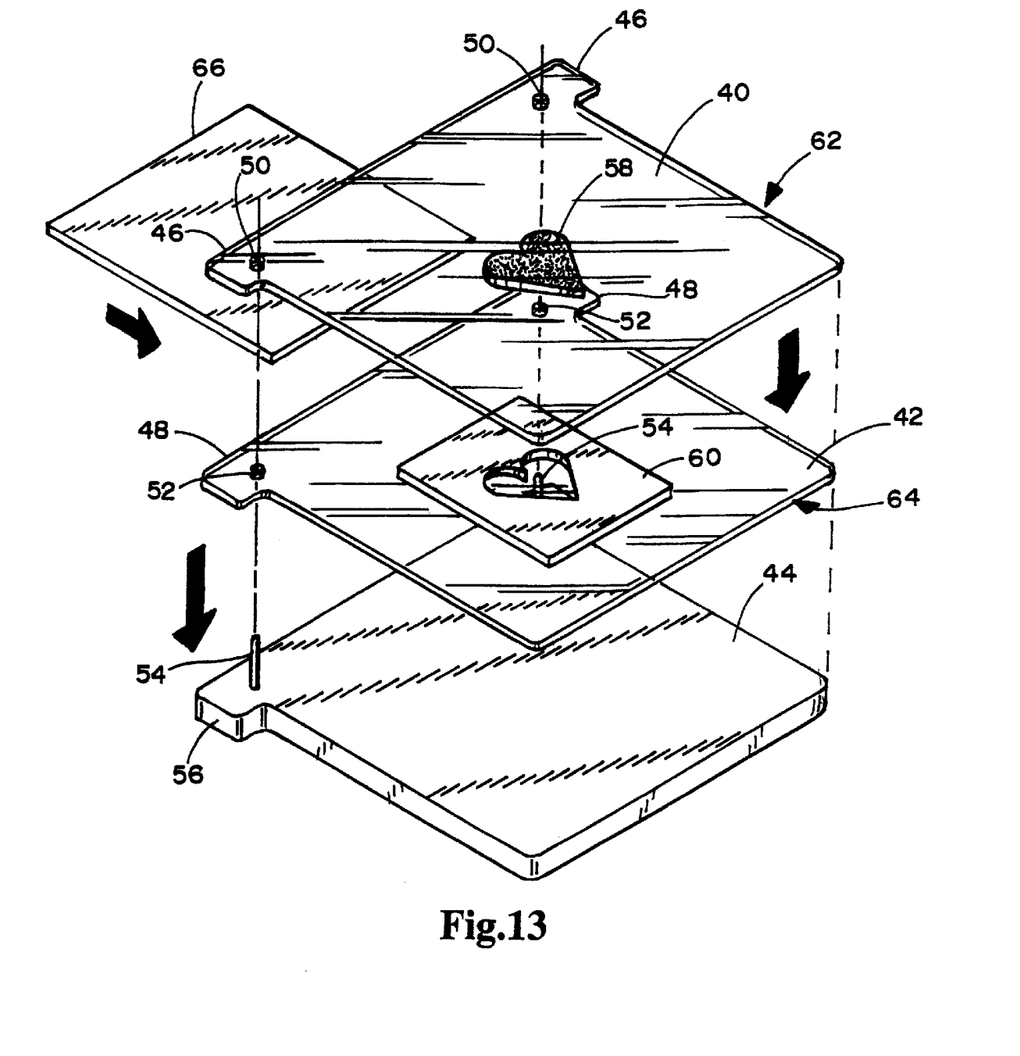
FIG. 13 is an exploded view which illustrates the formation of a matched set of male and female embossing dies according to a modification to the method illustrated in FIGS. 1–8.

FIG. 13 of the drawings illustrates a modification to the method illustrated in FIGS. 1–12 for making a matched set of embossing dies to permit a material to be easily embossed in an arts crafts environment without requiring special skills or complex equipment. The method of FIG. 13 begins with making an identical sandwich (designated 16) as that previously described when referring to FIG. 2. Therefore, and briefly referring once again to FIG. 2, the sandwich to be used in the modification of FIG. 13 also includes a substrate 12 having paper backings 8-1 and 10-2 bonded to the top and bottom of substrate 12 by respective adhesive layers 2 and 4. Similar to the method step described when referring to FIG. 3, a design to be embossed is cut through the sandwich 16. While the design cut through the sandwich 16 in FIG. 3 is the letter "F," for purposes of illustration, the design that is cut through the sandwich in the modification of FIG. 13 is heart shaped. Similar to the method steps described while referring to FIGS. 4–7, different portions of the paper backings 8-1 and 10-2 are removed from the heart shaped design cut through the sandwich to expose areas of the adhesive layers 2 and 4 therebelow.

For the method of FIG. 13, the sandwich is placed between a pair of relatively thin die plates 40 and 42. Each of the die plates 40 and 42 as shown has a generally rectangular shape and a flexible construction. However, the particular shape and material which characterize the pair of die plates 40 and 42 is not to be considered a limitation of this invention, provided that the shape of the die plates enables such die plates to be seated upon a relatively thick carrier plate 44 for a purpose that will soon be described.

In this regard, it is important that the pairs of die plates 40 and 42 be retained in spaced parallel alignment, one above the other, when they are seated on the carrier plate 44. To this end, a pair of ears 46 and 48 projects outwardly and in opposite directions from each of the pair of die plates 40 and 42. Pairs of holes 50 and 52 are formed through respective ones of the pairs of ears 46 and 48 of the die plates 40 and 42 so that in the assembled arrangement, with the die plates 40 and 42 disposed one above the other, the holes 50 and 52 will be axially aligned.

Registration of the die plates above one another is preserved by means of die registration pins 54 which project upwardly from a pair of ears 56 that extend outwardly and in opposite directions from the carrier plate 44. It may be appreciated that the size and location of the ears 56 of carrier plate 44 correspond with the size and the location of the ears 46 and 48 of the pair of die plates so that, with die plates 40 and 42 seated upon carrier plates 44, the die registration pins 54 will be received through the holes 50 and 52 in the ears 46 and 48 of die plates 40 and 42 in order to prevent the die plates from being displaced relative to one another and the carrier plate 44.

The carrier plate 44 upon which the die plates 40 and 42 are seated is formed from a stiff, non-compressible material such as wood, thick plastic, or the like. As indicated above, the size and shape of the carrier plate 44 must be sufficient to receive the pair of die plates 40 and 42 so that the carrier plate can be used as a transport and a support for positioning the die plates in a hand operated press by means of which the heart shaped design will be embossed into a suitable material 66.

More particularly, after the sandwich in which the design is cut has been placed between the pair die plates 40 and 42 with portions of the paper backings removed from opposite faces of the sandwich, the die plates are pushed together. Accordingly, the sandwich will be bonded to the die plates 40 and 42 at the exposed areas of adhesive. At this point, the pair of die plates 40 and 42 are pulled away from one another with a first part 58 of the design affixed to the bottom of one of the die plates 40 to form a male die half 62 and the remaining part 60 of the design affixed to the top of the other die plate 42 to form a female die half 64. As was the case when the matched set of male and female die halves 24 and 30 of FIGS. 6 and 7 were formed, the first and remaining parts 58 and 60 of the design that are affixed to the die plates 40 and 42 are complements of one another. That is to say, the combination or addition of the first and remaining parts 58 and 60 of the design will form the complete design that has been cut through the sandwich (as shown in FIG. 3).

A matched set of male and female embossing dies 62 and 64 is now formed having opposing die plates 40 and 42 that are to be positioned above one another and seated upon the carrier plate 44 so that the registration pins 54 are received through the axially aligned holes 50 and 52 in the ears 46 and 48. In use, the material 66 to be embossed is laid between the die halves 62 and 64. The carrier plate 44 is then transported and inserted within a commercially available, hand-operated die press, such as that manufactured by Ellison Educational, Inc. of Irvine, Calif., whereby compressive forces are applied to the pair of die plates 40 and 42 so as to force the male and female die halves 62 and 64 together with the material 66 held therebetween. The material 66 is then embossed with the heart shaped design in an identical manner to that described while referring previously to FIGS. 8–11.

By virtue of the foregoing method, a matched set of male and female embossing dies can be quickly and easily made in an arts and crafts environment at home, at school, or at the office. No complex die making tools are required and no special die making skills are needed. Many different dies can be made at relatively low cost. Moreover, the embossing dies can be easily used by simply forcing the matching pair of male and female die halves 24 and 30 or 62 and 64 together with the material 32 or 66 to be embossed positioned therebetween.

Although upper and lower adhesive film sheets 2 and 4 have been disclosed as being bonded to opposite faces of a substrate 12 to form a sandwich (e.g. 16 of FIG. 2), it is to be understood that the substrate can be coated with a liquid or spray adhesive rather than the adhesive film strips. In this case, the liquid or spray adhesive at opposite faces of the substrate would be covered with respective removable paper backings to form a sandwich through which the design will be cut to create the matched set of male and female die halves 24 and 30 or 62 and 64 in the manner described above.

We claim:

1. A method for making a die set and embossing a material with a design, said method comprising the steps of:

applying a layer of adhesive to opposite faces of a substrate;

attaching a backing over each of the layers of adhesive applied to the opposite faces of said substrate to form a sandwich with said substrate disposed between said backings;

cutting a design through said sandwich;

removing a first area of the backing attached to a first face of the substrate through which said design is cut to expose some of the adhesive layer which is applied to said first face;

bonding a first die plate to the first face of said substrate by means of the exposed adhesive layer applied to said first face;

removing a different area of the backing attached to the opposite face of the substrate through which said design is cut to expose some of the adhesive layer applied to said opposite face;

bonding a second die plate to the opposite face of said substrate by means of the exposed adhesive layer applied to said opposite face, whereby said first and second die plates are disposed one above the other with said substrate affixed therebetween;

pulling said first and second die plates away from one another so that a first part of the design that is cut through said sandwich and bonded to said first die plate is carried away from said sandwich by said first die plate to form a male die and the remaining part of the design that is cut through said sandwich and bonded to said second die plate is carried away from said sandwich by said second die plate to form a female die and;

embossing said design in said material with said first and second die plates.

2. The method for making a die set as recited in claim 1, wherein the first part of the design carried away by said first die plate and the remaining part of the design carried away by said second die plate are complements of one another which, when combined, form the complete design.

3. The method for making a die set as recited in claim 1, wherein said substrate is an incompressible plastic material.

4. The method for making a die set as recited in claim 1, wherein each of the layers of adhesive applied to the opposite faces of said substrate is a thin film adhesive sheet having an inner and an outer surface, said backing being initially attached to the inner and outer surfaces of each adhesive sheet.

5. The method for making a die set as recited in claim 4, including the additional steps of removing the backing from one of said inner or outer surfaces of each of the adhesive sheets and adhesively bonding said adhesive sheets to the opposite faces of said substrate to form said sandwich.

6. The method for making a die set as recited in claim 1, including the additional steps of placing said material to be embossed between said first and second die plates of said male and female dies and pressing said first and second die plates together, whereby said material is embossed with said design.

7. The method for making a die set as recited in claim 6, including the additional step of providing registration means to position said first and second die plates of said male and female dies in spaced parallel alignment so that the first and remaining parts of said design are moved towards one another when said first and second die plates are pressed together.

8. The method for making a die set as recited in claim 7, wherein said registration means includes at least one registration pin projecting from said first die plate of said male die and at least one hole formed in said second die plate of said female die to receive said registration pin whereby said first and second die plates are held in spaced parallel alignment so that the first and remaining parts of said design can be moved towards one another.

9. The method for mating a die set as recited in claim 7, wherein said registration means includes a carrier plate having at least one registration pin projecting therefrom, and each of said first and second die plates of said male and female dies having at least one hole formed therethrough, said first and second die plates laid above one another and seated upon said carrier plate so that said registration pin from said carrier plates is received in the holes of said first and second die plates.

10. The method for making a die set as recited in claim 9, including the additional steps of transporting said first and second die plates seated on said carrier plate to a die press and pressing said die plates together for moving the first and remaining parts of said design towards one another to emboss the material between said male and female dies with said design.

* * * * *